(12) United States Patent
Washizu

(10) Patent No.: US 6,195,181 B1
(45) Date of Patent: Feb. 27, 2001

(54) IMAGE READING APPARATUS

(75) Inventor: Yoichi Washizu, Higashimurayama (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/099,155

(22) Filed: Jun. 18, 1998

(30) Foreign Application Priority Data

Jun. 26, 1997 (JP) .................................................. 9-170678

(51) Int. Cl.$^7$ .................................................. H04N 1/04
(52) U.S. Cl. ........................ 358/475; 358/487; 358/496
(58) Field of Search .................... 358/475, 474, 358/497, 494, 488, 486, 487, 496, 509, 506, 505; 250/234–236

(56) References Cited

U.S. PATENT DOCUMENTS

| | | | |
|---|---|---|---|
| 5,673,125 | * 9/1997 | Merecki et l. | 358/487 |
| 5,818,611 | * 10/1998 | Shih | 358/474 |
| 5,822,087 | * 10/1998 | Tsai | 358/475 |
| 5,883,727 | * 3/1999 | Tsai | 358/475 |
| 5,907,411 | * 5/1999 | Han | 358/487 |

FOREIGN PATENT DOCUMENTS 7-23180   1/1995   (JP) .

* cited by examiner

Primary Examiner—Cheukfan Lee
(74) Attorney, Agent, or Firm—Ostrolenk, Faber, Gerb & Soffen, LLP

(57) ABSTRACT

An image reading apparatus in accordance with the present invention is an apparatus capable of reading an image from a transmissible original or reflective original. A lens unit and line sensor are located on one side of an original feed path. A tubular lamp movable to a position opposite to the lens unit with respect to the feed path and to a position on the side of the lens unit is included. The type of inserted original is judged by an original detector located near an original insertion port. If the inserted original is a transmissible original, the tubular lamp is moved to the position opposite to the lens unit. If the inserted original is a reflective original, the tubular lamp is moved to the position on the side of the lens unit. Furthermore, the power of the lens unit for projection is automatically adjusted in line with the type of original. In the case of the image reading apparatus, the way of handling is easy, the design is compact, and the cost can be reduced.

8 Claims, 12 Drawing Sheets

| | 13 |
|---|---|
| ILLUMINATION | : TRANSMISSION |
| READ RANGE | : NARROW |

| | 13 |
|---|---|
| ILLUMINATION | : REFLECTION |
| READ RANGE | : WIDE |

| | 13 |
|---|---|
| ILLUMINATION | : TRANSMISSION |
| READ RANGE | : WIDE |

| | 13 |
|---|---|
| ILLUMINATION | : REFLECTION |
| READ RANGE | : NARROW |

IMAGE READING APPARATUS

BACKGROUND OF THE INVENTION

1. Field of the Invention

The present invention relates to an image reading apparatus for reading an image from a transmissible original or reflective original and converting it into an electrical image signal.

2. Related Art Statement

In the past, for example, Japanese Unexamined Patent Publication No. 7-23180 has proposed an apparatus as an image reading apparatus for reading a non-transmissible original that is a reflective original or a transmissible original and converting it into electrical image information. An image signal output from the image reading apparatus is converted into digital data, transmitted to, for example, a personal computer or the like, and then utilized.

FIG. 14 is a sectional view of an image reading apparatus disclosed in the Japanese Unexamined Patent Publication No. 7-23180, showing a state in which a reflective original is read. FIG. 15 is a sectional view of part of the image reading apparatus in a state in which an image on a transmissible original is read. The image reading apparatus comprises a transmissible original station 102 which includes a light source unit 103 and on which a transmissible original 1 to be placed on the top of a main unit 101 is stationed, a reflective original station 104 including an original station glass plate 105 on which a reflective original 2 is stationed, a sub-scan drive motor 106 incorporated in the main unit 101, a timing belt 107 to be driven to rotate by means of the drive motor 106, a guide shaft 108 lying parallel to the timing belt 107, a reader 109 engaged with the timing belt 107 and moved along the guide shaft, and a transmissible original image formation optical system 110 located below the transmissible original station 102 and composed of an image formation lens and mirror.

The reader 109 includes a light source unit 111, an imaging optical system 112 composed of a mirror and image formation lens, and a line sensor 113 for converting a linear image extending in a main-scan direction into an electrical image signal.

As mentioned above, when the conventional image reading apparatus having the foregoing components reads a reflective original, the reflective original 2 is stationed on the glass plate 105 of the original station. The original 2 is held with the flatness thereof maintained by a cover. The reader 109 is driven in a direction X2, that is a sub-scan direction, by means of the drive motor 106, whereby an image is read from the reflective original 2.

For reading an image from a transmissible original, the reader 109 is, as shown in FIG. 15, moved to a position near the transmissible original station 102, and thus set to a state in which light transmitted by an original is routed to the line sensor 113 by the transmissible original illumination unit 103, imaging, optical system 110, and reflector. In the set state, the transmissible original 1 is driven in a direction X1 that is a sub-scan direction by means of a transmissible original driving means (not shown) included separately. Thus, the image on the transmissible original 1 is read.

However, in the image reading apparatus disclosed in the Japanese Unexamined Patent Publication No. 7-23180, the reflective original station 104 and transmissible original station 102 must be located on the main unit 101, and the light source units 111 and 103 must be located at different positions. This leads to the large main unit. Furthermore, as a sub-scan driving mechanism important to input a high-definition image, mechanisms dedicated to a reflective original and transmissible original respectively must be included. This increases cost. Moreover, depending on whether an original is the transmissible original or reflective original, the setting of the image reading apparatus must be modified by a user, that is, the position of the reader 109 must be changed by a user. Thus, poses an inconvenience.

SUMMARY OF THE INVENTION

The present invention is directed to solving to solve the foregoing problems. An object of the present invention is to provide an image reading apparatus capable of reading an image from a transmissible original or reflective original, which can be handled easily, designed compactly, and built inexpensively.

An image reading apparatus of the present invention is an image reading apparatus capable of reading an image from a transmissible original or reflective original, and comprises: a lens unit that moves in a direction substantially vertical to a stationed transmissible original or reflective original so as to form an image represented by light transmitted through the transmissible original or light reflected from the reflective original; an original judging means for judging the type of stationed original; an illumination unit capable of moving from one side of a stationed original to the other side thereof; and a control means for controlling an image-formed position on the lens unit and a set position of the illumination unit on the basis of judgment given by the original judging means.

The other features and advantages of the present invention will be fully apparent from the description below.

BRIEF DESCRIPTION OF THE DRAWINGS

FIG. 1B is a graph indicating an output provided by the line sensor in an image reading apparatus of the second embodiment of the present invention when an original is a transmissible original;

DETAILD DESCRIPTION OF THE PREFERRED EMBODIMENTS

Figure 1:
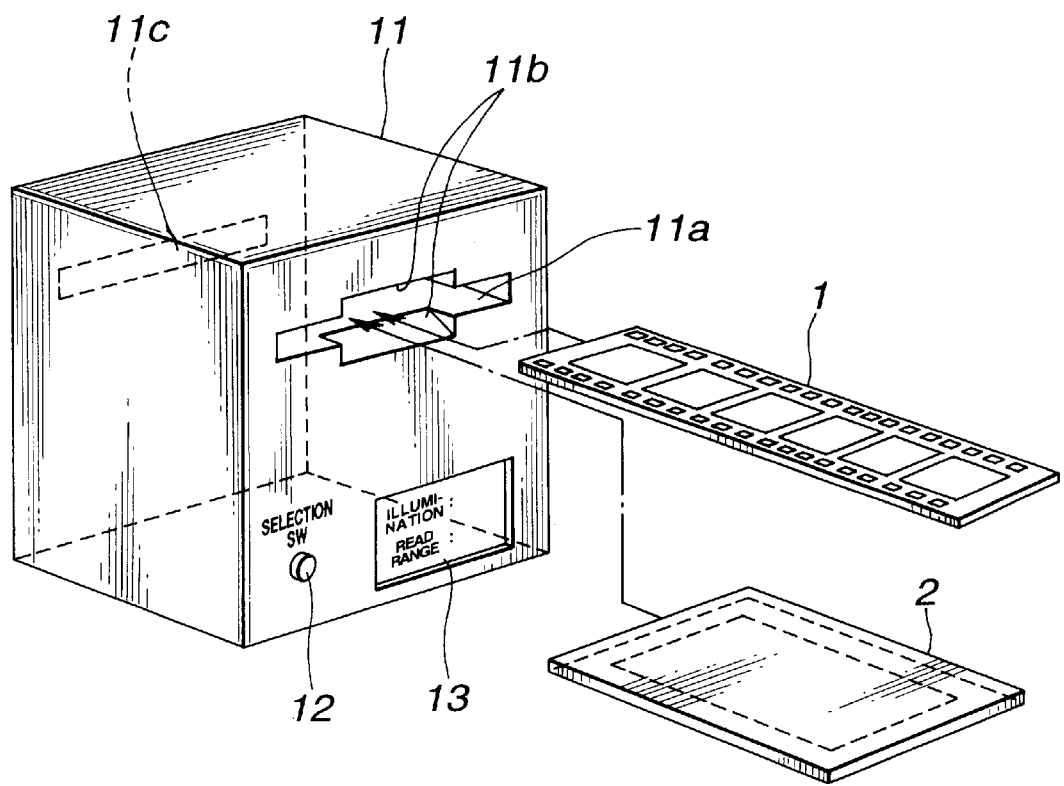
FIG. 1 is an oblique view showing the appearance of an image reading apparatus that is the first embodiment of the present invention.

Embodiments of the present invention will be described in conjunction with the drawings.

Prior to the description of image reading apparatuses of embodiments of the present invention, an image taking apparatus in accordance with the present invention will be briefly described.

An image taking apparatus in accordance with the present invention is an apparatus capable of moving an original for sub scan and reading either a transmissible original or reflective original. As the original, a developed 35-mm film that has generally prevailed as a transmissible original and a print having a size of approximately 90 mm by 120 mm which is a standard size for a reflective original can be adopted. However, when a type of original is selected manually, adaptable originals are not limited to the above ones.

Moreover, in this apparatus, a light source unit serving as an illuminating means movable to two positions for illuminating an original, an image formation lens serving as an imaging optical system, a line sensor serving as an imaging means, and an original feeding means are incorporated. These members are used in common between the transmissible and reflective originals. Moreover, an original detecting means is included. The type of inserted original is determined. If the inserted original is a transmissible original, the position of the illuminating means is changed in order to establish a state associated with the transmissible original. If the inserted original is a reflective original, the position of the illuminating means is changed in order to establish a state associated with the reflective original. Furthermore, the power of an optical system, which is an imaging means, for projection is changed automatically.

An image reading operation to be performed by the image taking apparatus having the foregoing configuration will be described.

To begin with, an original inserted through an original insertion port is detected by the original detecting means. Based on the output of the original detecting means, a control means judges whether the original is a transmissible original or reflective original. If the inserted original is a transmissible original, the control means causes the light source unit to move toward a position, at which illumination light is transmitted, opposite to the image formation lens and line sensor with the original between them. The original is then illuminated. The illumination light emanating from the light source unit is transmitted by the original, and an image represented by the illumination light is formed on the line sensor by means of the image formation lens. By contrast, if the original is a reflective original, the light source unit is moved toward a position, at which illumination light is reflected, on the side of the image formation lens and line sensor. The original is then illuminated. The illumination light emanating from the light source unit is reflected by the original, and an image represented by the illumination light is formed an image on the line sensor by means of the image formation lens.

Furthermore, the control means determines the power of the lens for projection and a read range according to an inserted original. Specifically, when the inserted original is a transmissible original, such as a 35-mm film for photography, a narrower range must be read at a high resolution. The lens is therefore set to a high power for projection. When the inserted original is a reflective original, such as a print, a wider range should be read at a low resolution. The lens is therefore set to a low power for projection. A zoom lens is used as the image formation lens, so that the power for projection can be changed readily.

When the foregoing illumination and lens setting is completed, an original is fed at a given speed in a sub-scan direction orthogonal to a main-scan direction of the line sensor by means of a roller serving as the original feeding means. An image is then read in units of a scanning line by the line sensor. The foregoing series of operations is carried out automatically under the control of the control means.

Incidentally, two methods are adaptable as a method of judging the type of original. The first method is a method of judging the type of original by detecting the size of an original. When the width of an inserted original is small, the original is judged to be a 35-mm a transmissible original, like a 35-mm film. When the width of the inserted original is large, the original is judged to be a reflective original, like a print. The second method is a method of judging the type of original by detecting the transmittance of an original. After the apparatus is brought to a state in which a transmissible original is scanned, part of an inserted original is scanned. An output of the line sensor is checked to see if the inserted original is a transmissible original or reflective original.

The image reading apparatus of the first embodiment of the present invention will be detailed by describing the configuration thereof first.

Referring now to drawings wherein like numerals indicated like elements, there is shown in FIGS. 1–5 a first embodiment of the image reading apparatus of the present invention. With this apparatus, an image can be read from a developed 35-mm film 1 serving as a transmissible original 1, such as a developed 35-mm film or a reflective original 2, such as a print that is made by printing a picture on a sheet of print paper of approximately 90 mm by 120 mm in size. The type of inserted original is detected, and reading is carried out according to the type. As for an original having any other size, a read scan state is set manually and an image is read.

The image reading apparatus comprises: as components incorporated in a main unit 11, an original detector 24 (FIG. 2) serving as an original detecting means and lying near an original insertion port 11a; an original feed mechanism 21 that is composed of a pair of rollers 21a and 21b, serves as an original feeding means, and also lies near the original insertion port 11a; a tubular lamp 41 included in a light source unit serving as an illuminating means; support arms 42 freely pivotable for holding the tubular lamp 41 and supported by support shafts 42a; a drive shaft 47 for driving the support arms 42; a lens unit 43 whose power for projection is variable and in which image formation lenses 45 and 46 constituting an imaging optical system are incorporated; a drive motor 48 for driving the drive shaft 47 and lens unit 43 simultaneously; a CPU 32 serving as a control means and mounted on a printed-circuit board 31; and a line sensor 33 serving as a reading means.

Furthermore, the main unit 11 of the image reading apparatus has the original insertion port 11a, an original ejection port 11c, a manual selection switch 12 used to select a set state specifying the position of the lamp and the power of the lenses for projection according to the type of inserted original, and an LCD indicator 13 for indicating the contents of setting of the position of the lamp and the power of the lenses for projection.

The original such as 35-mm film 1 or a print 2, is inserted through the original insertion port 11a until the original abuts on the feed rollers 21a and 21b. A concave index 11b (FIG. 1) having the same width as the 35-mm film 1 is located inside the original insertion port 11a. For inserting the 35-mm film 1, an image portion of the film is matched with the index llb.

The CPU 32 is a control means responsible for control of the whole apparatus, and controls the operations of controlled elements. Especially, the CPU 32 fetches an output of the line sensor 33, stores an image signal in an internal memory, and outputs the image signal to an external image processing apparatus such as a personal computer. Moreover, a judging means for fetching an output of the original detector 24 and judging the type of original is incorporated in the CPU 32.

Figure 5:
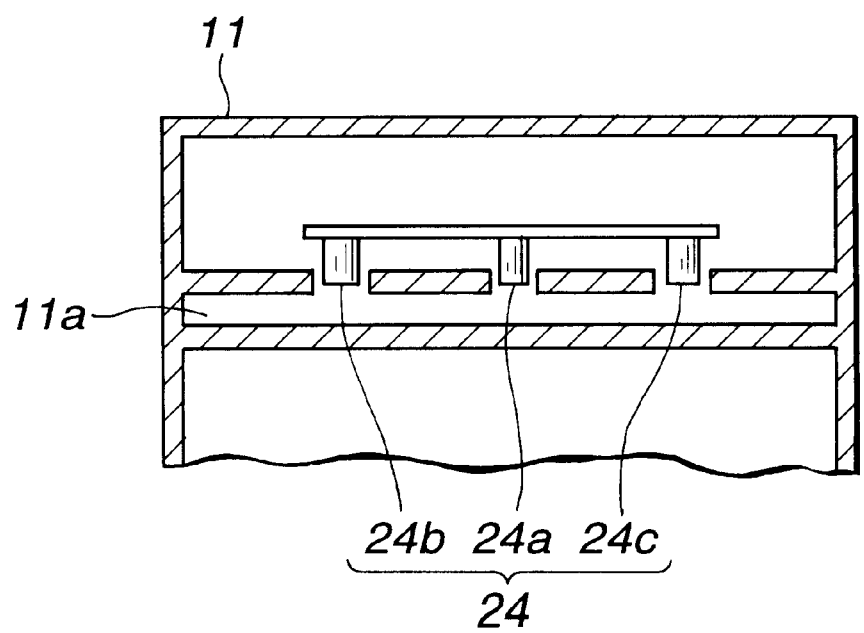
FIG. 5 is a sectional view showing an original detector and its surroundings in the image reading apparatus shown in FIG. 1.

The original detector 24 is composed of three photoreflectors (hereinafter PIs) 24a, 24b, and 24c (FIG. 5). Detection signals provided by the PIs are sent to the CPU 32 on the printed-circuit board 31. The PI 24a is located to coincide with the middle of the original insertion port 11a. The PIs 24b and 24c are located symmetrically around the PI 24a. The spacing between the PIs 24b and 24c is set to be a bit larger than 50 mm. The three detector PIs 24a, 24b, and 24c are arranged parallel to the line sensor 33. By checking if all or port of the three PIs have detected an original, the size in a main-scan direction of an inserted original can be determined.

When the 35-mm film 1 is a strip film, the width of the 35-mm film 1 is approximately 35 mm. The width of a mounted strip film is approximately 50 mm. Moreover, the width of the print 2 is 90 mm. When an inserted original is the 35-mm film 1, the PI 24a outputs an on-state signal that is an original detection signal, but the PIs 24b and 24c do not output the original detection signal. When the inserted original is the print 2, all of the PIs 24a, 24b, and 24c output the on-state signal that is the original detection signal.

When the CPU 32 senses an on-state signal output from the PI 24a, it judges that the 35-mm film 1 that is a narrow transmissible original has been inserted. When the CPU 32 senses on-state signals output from all the PIs 24a, 24b, and 24c, it judges that the print 2 that is a wide reflective original has been inserted.

The original feed mechanism 21 is a mechanism for feeding an original in a sub-scan direction that is a direction orthogonal to a main-scan direction in which the line sensor 31 scans an original. The mechanism 21 consists, as shown in the sectional view of FIG. 4, of a driving feed roller 21a, a driven feed roller 21b whose support shaft is supported in elongated holes lid and which is borne to be movable vertically on the side of the roller 21a, a stepping motor 26 for feeding and driving, an intermediate gear 27, and a spring 23 for pressing the driven feed roller 21 to the driving feed roller 21a.

In the feed mechanism 21, a gear 25 is fixed to an output shaft of the stepping motor 26. The gear 25 is engaged with a gear 21a fixed to the feed roller 21a via the intermediate gear 27. Moreover, the feed roller 21b is constrained to go in a direction, in which the feed roller 21b is brought into contact with the feed roller 21a, by means of a constraining force of the spring 23. The feed rollers 21a and 21b are therefore driven by the stepping motor 26. An original inserted between the feed rollers 21a and 21b is fed while being sandwiched between the two rollers.

Since the feed roller 21b is borne to be movable only vertically, even a thick original, for example, a mounted film or a strip film mounted in a film carrier to be described later can be fed.

Moreover, since the feed roller 21a is driven by the stepping motor 26, a feed speed and a magnitude of feed per step can be controlled accurately. For example, when the CPU 32 judges that an inserted original is the 35-mm film 1, the magnitude of feed per line or step of reading an original is set to a small value in order to enable high-resolution reading. Moreover, when the CPU 32 judges that the inserted original is the print 2, the magnitude of feed per line or step of reading an original is set to a large value in order to enable low-resolution reading.

Figure 2:
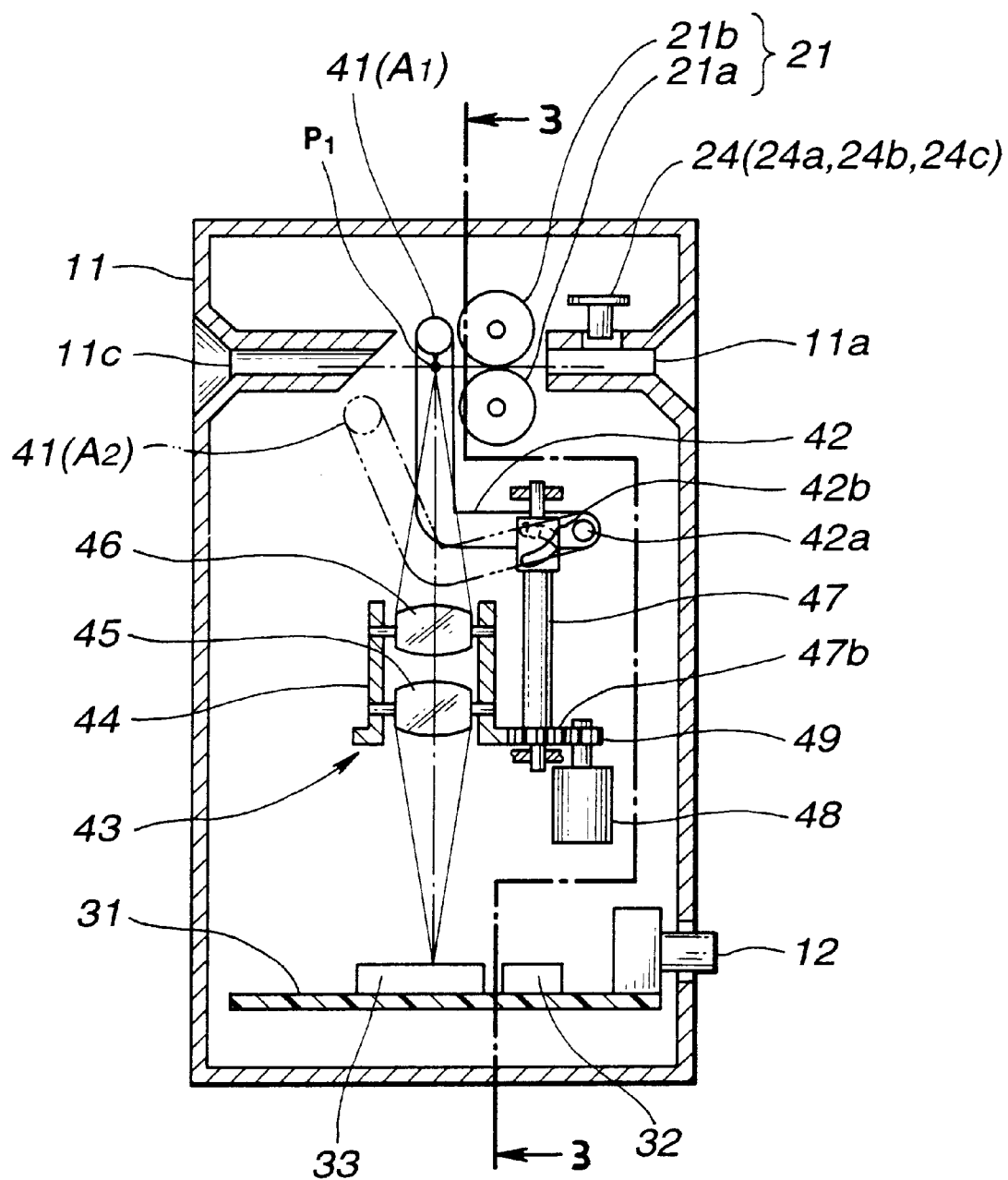
FIG. 2 is a longitudinal sectional view of the image reading apparatus shown in FIG. 1.
Figure 3:
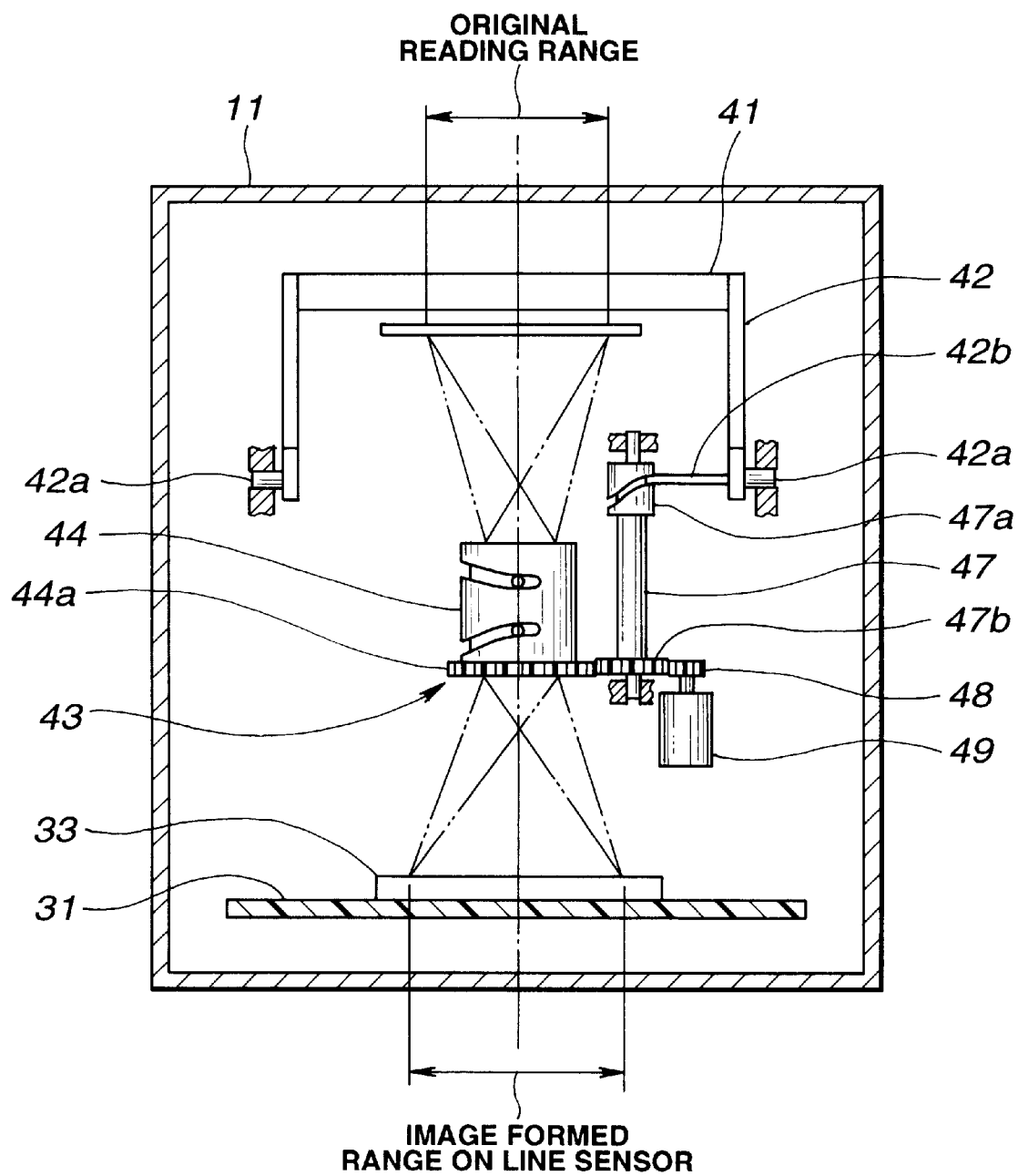
FIG. 3 is a 3—3 sectional view of the image reading apparatus shown in FIG. 2.
Figure 4:
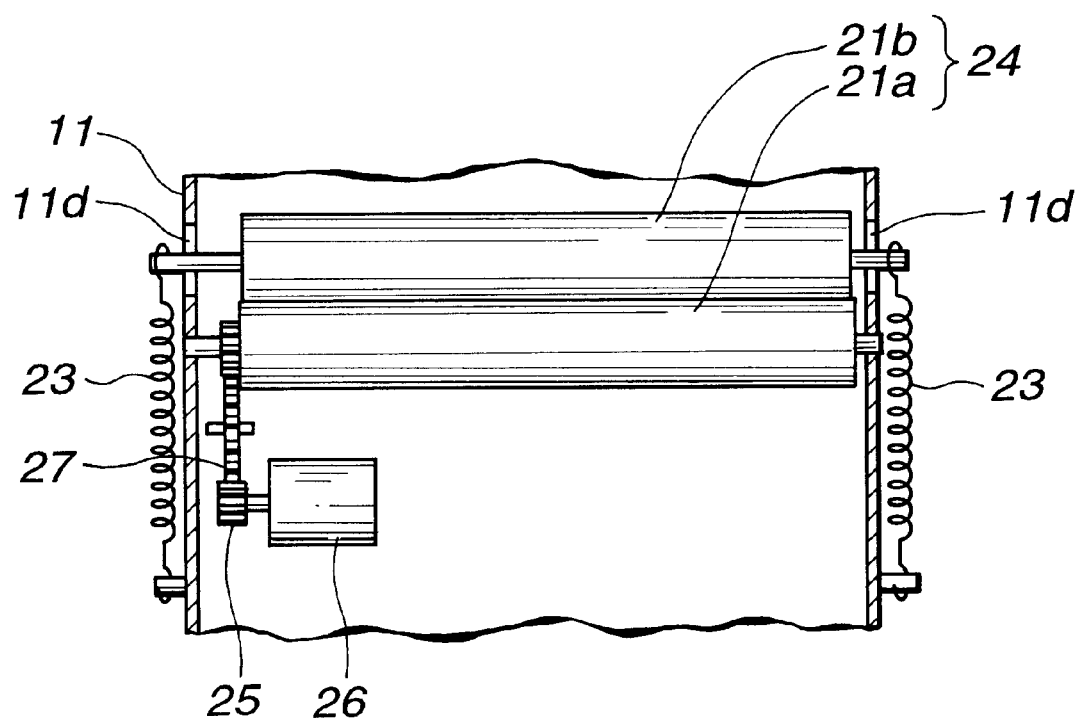
FIG. 4 is a sectional view showing a feed mechanism and its surroundings in the image reading apparatus shown in FIG. 1.

The tubular lamp 41 in the light source unit is a fluorescent lamp or the like. As shown in FIGS. 2 and 3, both ends of the tubular lamp are supported by the support arms 42. The support arms 42 are borne to be rotatable by means of the support shafts 42a. Furthermore, a drive pin attached to one of the support arms 42 is fitted into a drive cam 47a that rotates together with the drive shaft 47. The support arms 42 are driven to rotate by means of the drive shaft 47. A drive gear 47b is fixed to the drive shaft 47 and driven by the drive motor 49 via a gear 48 attached to the output shaft of the drive motor. The position of the lamp 41 can therefore be changed by means of the drive motor 48.

When an inserted original is the 35-mm film 1 that is a transmissible original, the tubular lamp 41 is moved to a position above the original, that is, a position Al opposite to the image formation lenses. When the inserted original is the print 2 that is a reflective original, the tubular lamp 41 is moved to a position below the original, that is, a position A2 on the side of the image-formation lens (See FIG. 2).

The lens unit 43 is a zoom lens unit whose power can be varied, and composed of the image formation lenses 45 and 46, and an annular cam 44 for power variation. The drive pins of the image formation lenses 45 and 46 are engaged with the power variation cam 44. With rotation of the power variation cam 44, the image formation lenses are moved properly. The magnification of a projected image is varied.

Figure 6:
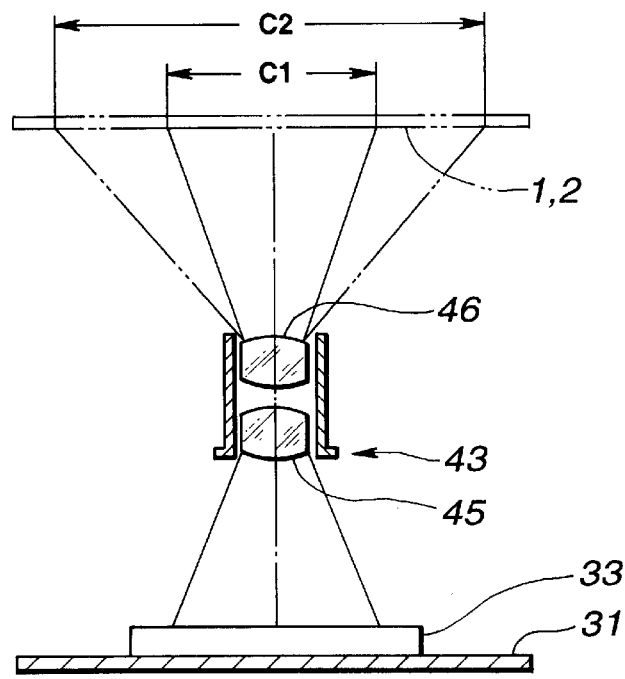
FIG. 6 is a diagram showing a read range of an original to be defined when the power of a lens unit of the image reading apparatus shown in FIG. 1 is varied.

FIG. 6 shows read ranges on an original defined by varying the power of the lens unit 43.

A read range C1 is a read range defined by setting the power of the lens unit 43 to a power for projection B1 that is a high power, and substantially coincident with a picture zone on the 35-mm film 1. A read range C2 is a read range defined by setting the power of the lens unit 43 to a power for projection B2 that is a low power, and substantially coincident with a picture zone on the print 2. A range for a projected image on the line sensor is the same between the read ranges C1 and C2. The power for projection B1 is larger than the power for projection B2. The 35-mm film 1 for which the read range C1 is selected can be read at a higher resolution.

A gear 44a is fixed to the power variation cam 44 and engaged with the gear 47b of the drive shaft 47. The drive shaft 47 is, as mentioned above, driven by the drive motor 48. The lens unit 43 is driven together with the lamp 41 by the drive motor 48, whereby the power of the lens unit is varied.

Figure 7:
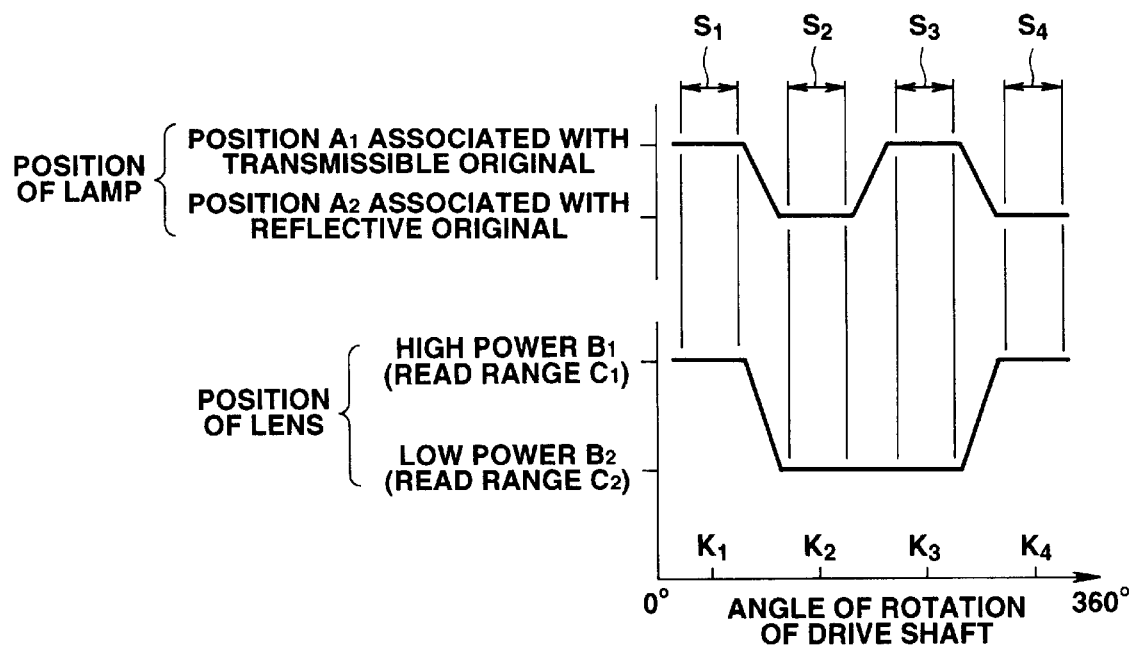
FIG. 7 is a graph indicating a change in set state of a lamp and lens unit in relation to an angle of rotation of a drive shaft of the image reading apparatus shown in FIG. 1.
Figures 8A, 8B, 8C, 8D, 9:
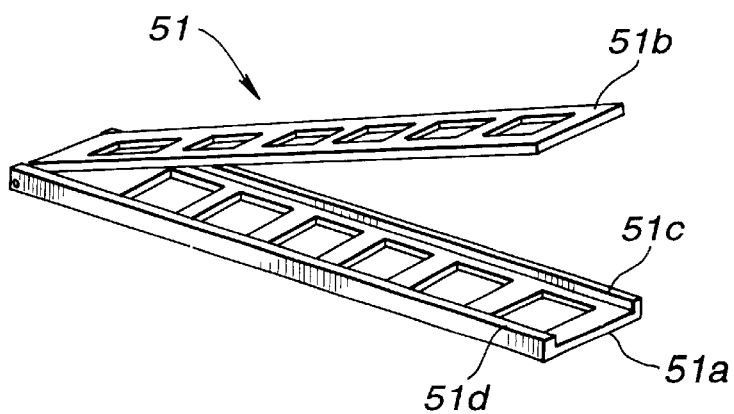
FIG. 8A is a diagram showing an illuminated state and read range associated with a first set state of the lamp and lens unit which are indicated by an LCD indicator of the image reading apparatus shown in FIG. 1.
FIG. 8B is a diagram showing an illuminated state and read range associated with a second set state of the lamp and lens unit which are indicated by the LCD indicator of the image reading apparatus shown in FIG. 1.
FIG. 8C is a diagram showing an illuminated state and read range associated with a third set state of the lamp and lens unit which are indicated by the LCD indicator of the image reading apparatus shown in FIG. 1.
FIG. 8D is a diagram showing an illuminated state and read range associated with a fourth set state of the lamp and lens unit which are indicated by the LCD indicator of the image reading apparatus shown in FIG. 1.
FIG. 9 is an oblique view of a film carrier for holding a 35-mm film adaptable to the image reading apparatus shown in FIG. 1.

FIG. 7 is a diagram showing a change in the set state of the lamp and lens unit in relation to the angle of rotation of the drive shaft. FIGS. 8A, 8B, 8C and 8D are diagrams showing indications of the set states on the LCD indicator 13. Referring to FIGS. 7 to 8D, the set states to which the lamp 41 and lens unit are normally set in relation to the two types of originals inserted, and the states of display on the LCD indicator 13 will be described.

To begin with, when an inserted original is detected to be the 35-mm film 1, the CPU 32 drives the drive motor 48 so as to rotate the drive shaft 47 by an angle of rotation K1. This causes the lamp 41 to move to the position A1 on the optical axis opposite to the lenses with respect to the surface of an original. Furthermore, the power of the lens unit 43 is set to the power for projection B1 that is a high power. The read range is set to the read range C1 substantially consistent with the picture zone on the 35-mm film 1. This state shall be called a "first lamp/lenses set state S1."

At this time, the LCD indicator 13 indicates, as shown in FIG. 8A, on the basis of a control signal sent from the CPU 32 that the illumination lamp is located at the position associated with a transmissible original and the read range is narrow. In the above state, illumination light passes through a range for a picture on the 35-mm film that is the transmissible original, and forms an image on the line sensor 33 via the lens unit 43.

When an inserted original is detected to be the print 2, the CPU 32 drives the drive motor 48 so as to rotate the drive shaft 47 by an angle of rotation K2. This causes the lamp 41 to move to the position A2 off the optical axis on the side of the lenses with respect to the surface of the original. Furthermore, the power of the lens unit 43 is set to the power for projection B2 that is a low power, and the read range is set to the read range C2 substantially coincident with the picture zone on the print 2. This state shall be called a "second lamp/lenses set state."

At this time, the LCD indicator 13 indicates, as shown in FIG. 8B, that the illumination lamp is located at the position associated with a reflective original and the read range is wide. In the above state, illumination light is reflected from a range for a picture on the print that is the reflective original, and forms an image on the line sensor 33 via the lens unit 43.

Furthermore, for taking an image from a special original other than the foregoing ones, the CPU 32 further drives, as shown in FIG. 7, the drive motor 48 so as to rotate the drive shaft 47 by an angle of rotation K3 or K4. A state to which the lamp and lenses are set after the drive shaft is rotated by the angle of rotation K3 or K4 is a third or fourth lamp/lenses set state S3 or S4. Specifically, the lamp 41 is located at the position A1 associated with a transmissible original, and the power of the lens unit 43 is set to the power for projection B2 that is a low power. Alternatively, the lamp 41 is located at the position A2 associated with a reflective original, and the power of the lens unit 43 is set to the power for projection B1 that is a high power.

At this time, the LCD indicator 13 indicates, as shown in FIG. 8C, that the illumination lamp is located at the position associated with a transmissible original and the read range is wide. Moreover, in the fourth lamp/lenses set state S4, it is, as shown in FIG. 8D, indicated that the illumination lamp is located at the position associated with a reflective original and the read range is narrow.

The third or fourth lamp/lenses set state S3 or S4 is a state to be established by handling the manual selection switch 12 during image reading (3) to be described later in conjunction with FIG. 12.

An image reading operation performed by the image reading apparatus of this embodiment having the foregoing configuration will be described in conjunction with the flowchart of FIG. 10 describing image reading (1).

First, an original is inserted through the original insertion port 11a (step S101). The CPU 32 fetches detection signals sent from the three PIs 24a, 24b, and 24c of the original detector 24, and judges the type of inserted original, that is, whether the inserted original is a transmissible original or reflective original (steps S102 and S103). Thereafter, the position of the lamp suggesting an illuminated state of an original associated with the type of inserted original, and a read range of an image are indicated (step S104). According to the inserted original, the lamp 41 is moved to the position A1 or A2. The power of the lens unit 43 is set to the power for projection B1 or B2 (S105).

After the position of the lamp and the power of the lenses for projection are set, powering the stepping motor 26 is started with an instruction issued from the CPU 32, and driving the feed rollers 21a and 21b is started with an instruction (step S106). When an edge of a picture on an original sent by the feed rollers 21a and 21b reaches a position P1 (FIG. 2) on the optical axis of the lenses, the image is projected on the line sensor 33 by the lens unit 43. Reading is then started (step S107). Synchronization of reading by the line sensor 33 and feeding of an original is controlled by the CPU 32.

As described above, according to the image reading apparatus of the first embodiment, it is judged from an output of the original detector 24 whether or not an inserted original is the 35-mm film 1 that is a transmissible original or the print 2 that is a reflective original. The position of the lamp 41 and the power of the lens unit 43 for projection are set automatically. The lamp and lenses are therefore set automatically. An image on an original can therefore be read reliably. Furthermore, the lamp 41, lens unit 43, line sensor 33, and original feed mechanism 21 which are used in common between a transmissible original and reflective original are employed. This leads to the compact design and low cost of the apparatus.

Now, a film carrier for holding a 35-mm film that is a transmissible original will be described in conjunction with the oblique view of FIG. 9. A film carrier 51 shown in FIG. 9 is designed to facilitate easy handling. That is to say, the strip type 35-mm film 1 is fitted in a rigid frame in order to prevent it from flawing. The film carrier 51 is composed of a tray 51a on which a film strip that is the 35-mm film 1 is placed and a rotatable presser lid 51b. The tray 51a and presser lid 51b have rectangular openings to be coincident with frames. The tray 51a has walls 51c and 51d which facilitate loading of a strip film.

A strip film is placed on the tray 51a and the presser lid 51b is closed, whereby the position of a film is locked and the flatness of the film is maintained. In this embodiment, the type of original is judged by checking the width of an original. The width of the film carrier 51 is 50 mm or less. When a detected width is 50 mm or less, an inserted original is judged as a transmissible original.

Next, an image reading apparatus of the second embodiment of the present invention will be described.

In the image reading apparatus of the first embodiment, the original detector judges the type of original by checking the size of an original using reflected light. The apparatus of this embodiment adopts a method in which part of an original is brought to a state in which illumination light is transmitted, and scanned temporarily, and then the type of original, that is, whether an inserted original is a transmissible original or reflective original is judged on the basis of the transmittance of the original.

Figure 11A:
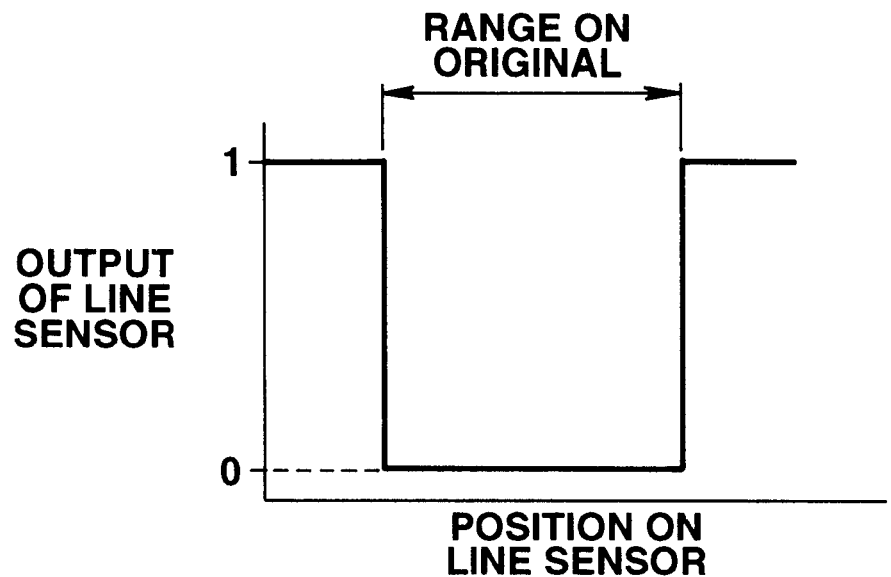
FIG. 11A is a graph indicating an output provided by a line sensor in an image reading apparatus of the second embodiment of the present invention when an original is a reflective original.
Figure 11B:
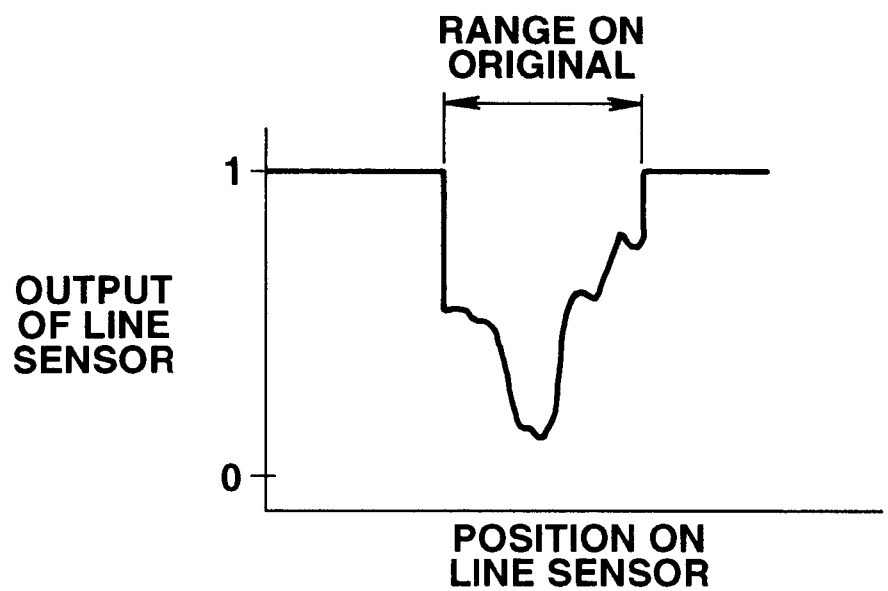

Specifically, when a reflective original is read with the lamp 41 set at the position A1 associated with a transmissible original, the output of the line sensor 33 is plotted as shown in FIG. 11A that is a graph indicating the output of the line sensor in the apparatus of this embodiment. Since the transmittance of the original is zero, an output of the portion of the line sensor 33 coincident with the original therefore is a 0. Moreover, since illumination light emanating from the lamp 41 falls directly on the portions of the line sensor 33 not facing the original, the outputs of the portions of the line sensor 33 are 1s. That is to say, when the reflective original is inserted, the output of the line sensor is a 0 or 1. By contrast, when the 35-mm film that is the transmissible original is read, the output of the line sensor is plotted as shown in FIG. 11B. Since the transmittance of an image on an original may assume a value proportional to an intermediate value of 0 and 1. The output of the portion of the line sensor 33 coincident with an original may therefore assume the intermediate value of 0 and 1. Since illumination light emanating from the lamp 41 falls directly on the portions of the line sensor 33 not facing the original, the outputs of the portions of the line sensor 33 are 1s. That is to say, when the transmissible original is inserted, the output of the line sensor is not only a 0 or 1 but also the intermediate value of 0 and 1. Thus, from a difference of one output of the line sensor from another, it can be judged whether an original is the reflective original or transmissible original.

The configuration of the image reading apparatus of this embodiment is substantially identical to the configuration of the apparatus of the first embodiment shown in FIG. 2. The PIs 24a, 24b, and 24c for detecting the type of original are unnecessary. Instead of them, one insertion detection switch for detecting insertion of an original is needed. The other components are identical to those of the first embodiment. The same reference numerals as those in FIG. 2 and others will therefore be assigned to the components other than the original detector.

An image reading operation including original type judgment to be carried out by the image reading apparatus of this embodiment will be described in conjunction with the flowchart of FIG. 12 describing image reading (2).

After the CPU 32 detects insertion of an original on the basis of an output of the insertion detection switch (steps S201 and S202), the first or third lamp/lenses set state S1 or S3 that is a state in which a transmissible original can be read is established from among the set states shown in FIG. 7 (step S203).

Thereafter, the inserted original is fed by driving the feed rollers 21a and 21b (step S204), and part of the original is read (step S205). A read range is a zone on the original around the center in width of the original insertion port 11a in which the original exists surely, that is, a zone on the original projected around the center of the line sensor 33.

As a result of reading an image on the original, when the center portion of the line sensor 33 outputs a 0, it means that the transmittance of the original is zero. The inserted original is judged as a reflective original. Moreover, when the output of the center portion of the line sensor 33 is a value equal to or larger than a certain value, the transmittance of the original is not zero. The inserted original is therefore judged as a transmissible original. After the type of the original is judged (step S206), the distal end of the original is brought back to the position P1 on the center line of the optical axis of the lenses (See FIG. 2) (step S207).

The illuminated state of an inserted original associated with the type of the original and the read range on an original are indicated (step S208). If the inserted original is the 35-mm film 1 that is a transmissible original, the lamp 41 and lens unit 43 are moved or driven to the first lamp/lenses set state S1. If the inserted original is the print 2 that is a reflective original, the lamp 41 and lens unit 43 are moved or driven to the second lamp/lenses set state S2 (step S209).

The feed rollers 21a and 21b are driven again in order to start original feeding (step S210). While the original is fed, an image on the original is read up to the end thereof (step S211). The routine is then terminated.

As mentioned above, according to the image reading apparatus of the second embodiment, when the type of inserted original is judged, part of an image on the inserted original is read in the form of transmitted light by the line sensor 33. Depending on whether or not an output of the line sensor 33 is a 0, it is judged whether the inserted original is a transmissible original or reflective original. Judgment of the type of original is therefore made quite accurately. A reading error dependent on the size of an original will not occur. Moreover, an original type detector is not needed. This is advantageous even cost-wise.

Figure 10:
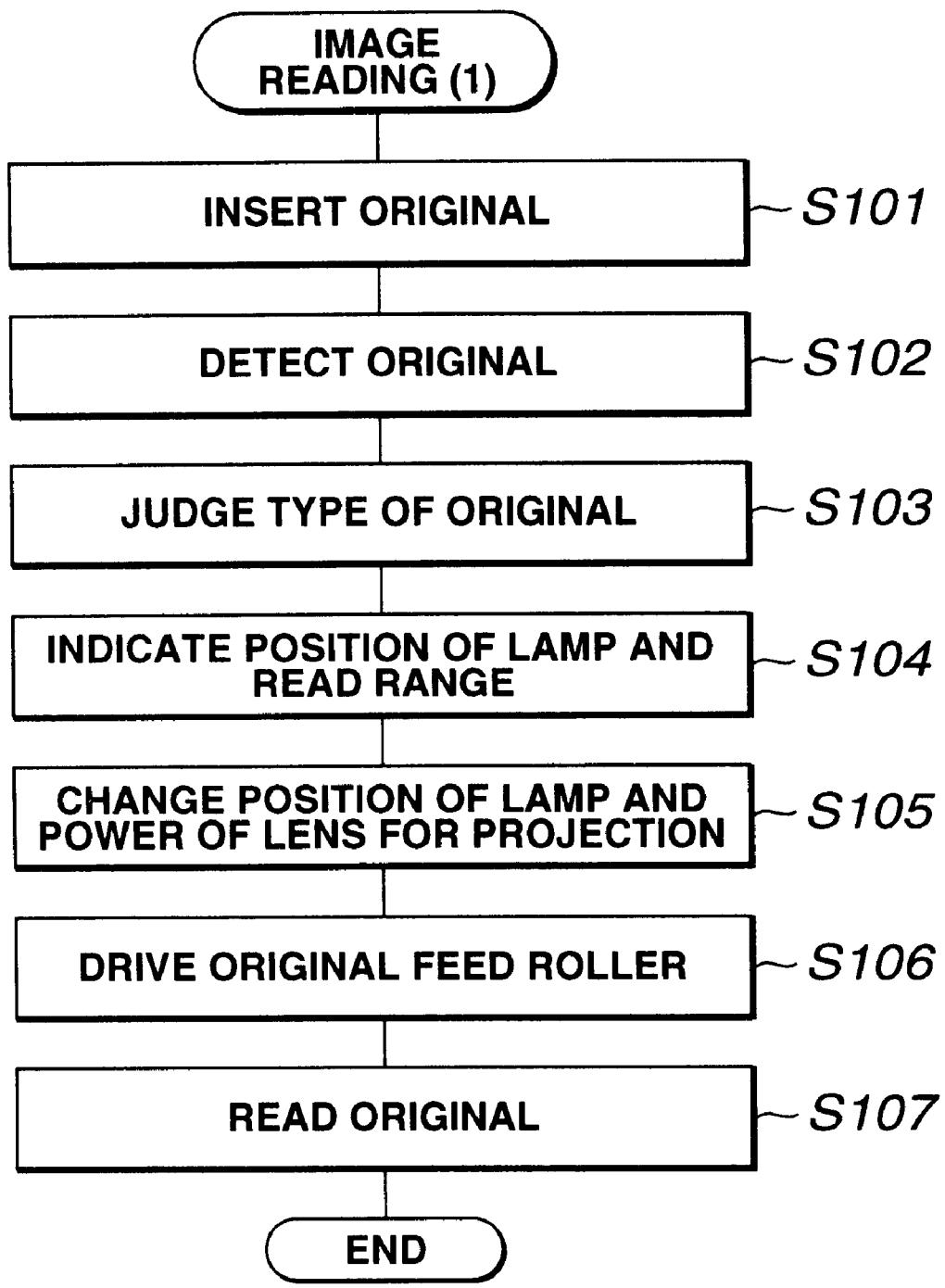
FIG. 10 is a flowchart of image reading (1) carried out by the image reading apparatus shown in FIG. 1.
Figure 12:
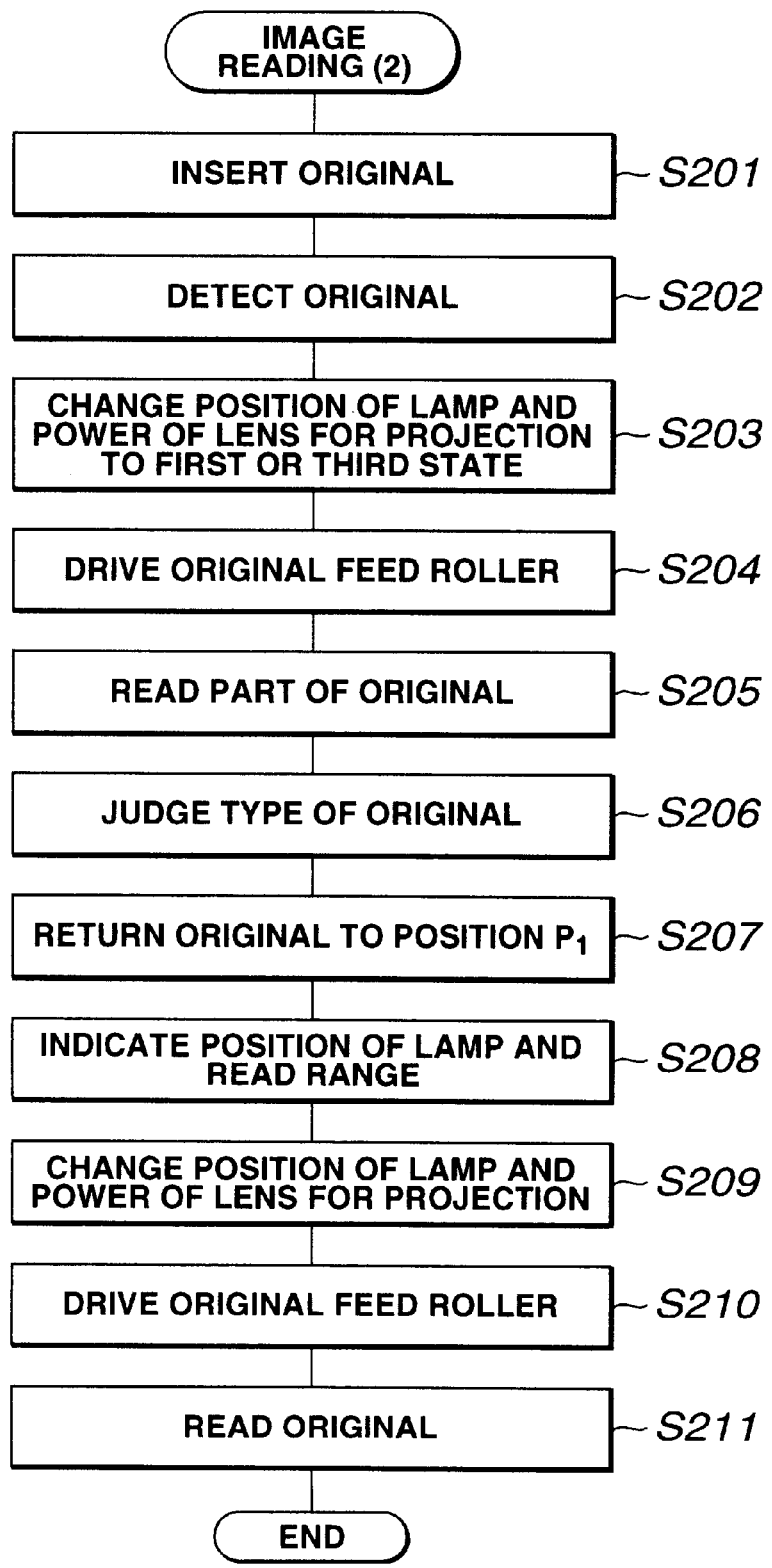
FIG. 12 is a flowchart describing image reading (2) to be carried out by the image reading apparatus shown in FIG. 11A.

The aforesaid image reading operations performed by the image reading apparatuses of the first and second embodiments are such that, as described in the flowcharts of FIGS. 10 and 12, the type of inserted original is judged in order to automatically set the position of the lamp and the power of the lens unit. In the image reading apparatuses of the first and second embodiments, a desired lamp/lenses set state can be selected by handling the manual selection switch 12 formed on the main unit 11. Image reading can be executed in the set state.

In automatic setting described as part of the processing in conjunction with FIGS. 10 and 12, an original has been said to be available in two types; the 35-mm film 1 and sheet of print paper 2. However, originals other than these types of originals exist. Despite a transmissible original, it may be a large-size film that is larger than the 35-mm film. An image on the large-size film may have to be taken. Moreover, despite a reflective original, a narrow range on the original may have to be read at a high power. These requests for image reading can be satisfied by manually selecting any of set states as described below.

States capable of being selectively established manually are, as mentioned above, the four states shown in FIG. 7. That is to say, the four states are the first lamp/lenses set state S1 to the fourth lamp/lenses set state S4. For each of the set states, the position of the lamp 41, and a read range defined by setting the power of the lenses for projection are specified. Any of the four states can be specified merely by pressing the selection switch 12 formed on the face of the main unit 11 so as to give an instruction to the CPU 32 and to thus rotate the drive shaft 47.

Figure 13:
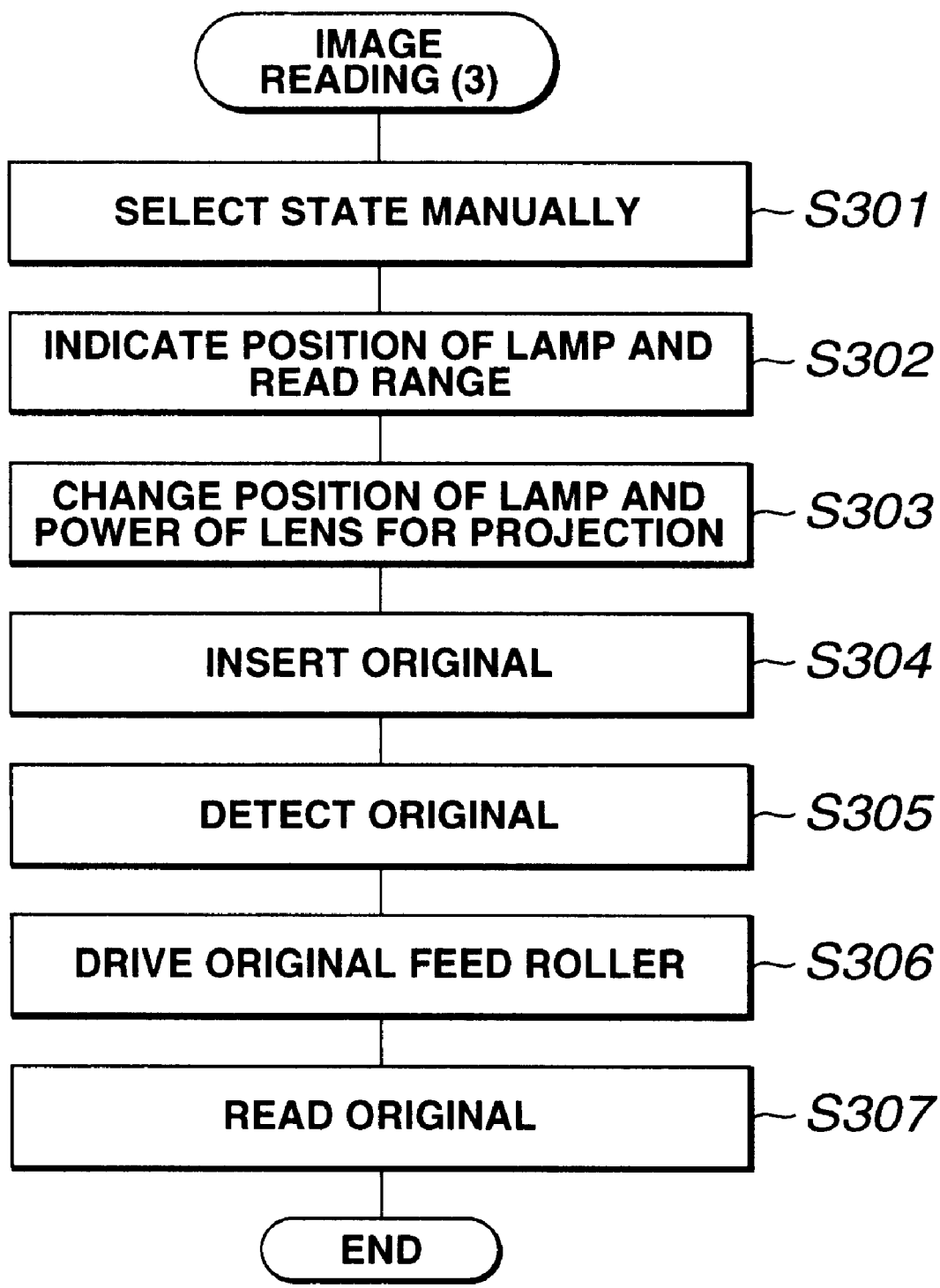
FIG. 13 is a flowchart describing image reading (3) to be carried out by the image reading apparatus shown in FIG. 1 or 11A when a set state is selected manually.
Figure 14:
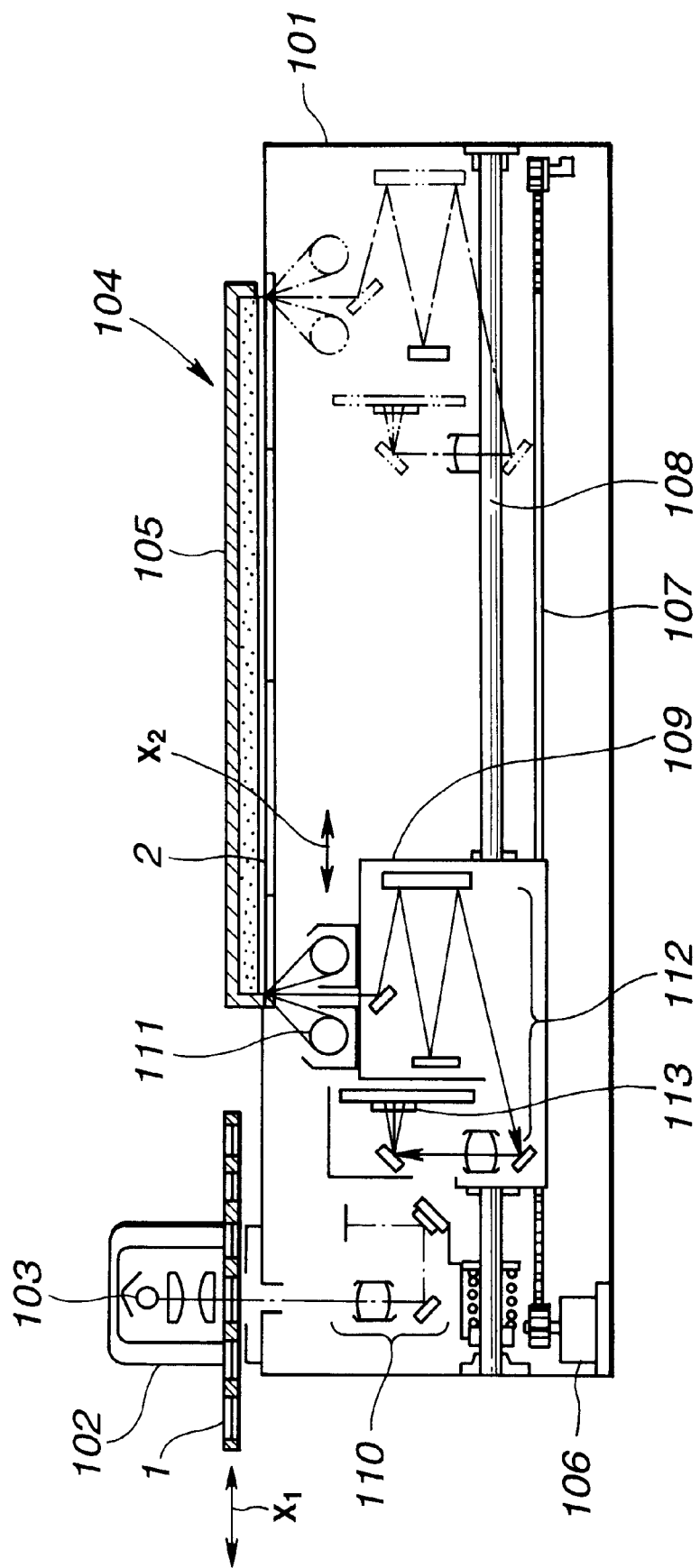
FIG. 14 is a longitudinal sectional view of a conventional image reading apparatus, showing a state in which an image is read from a reflective original.
Figure 15:
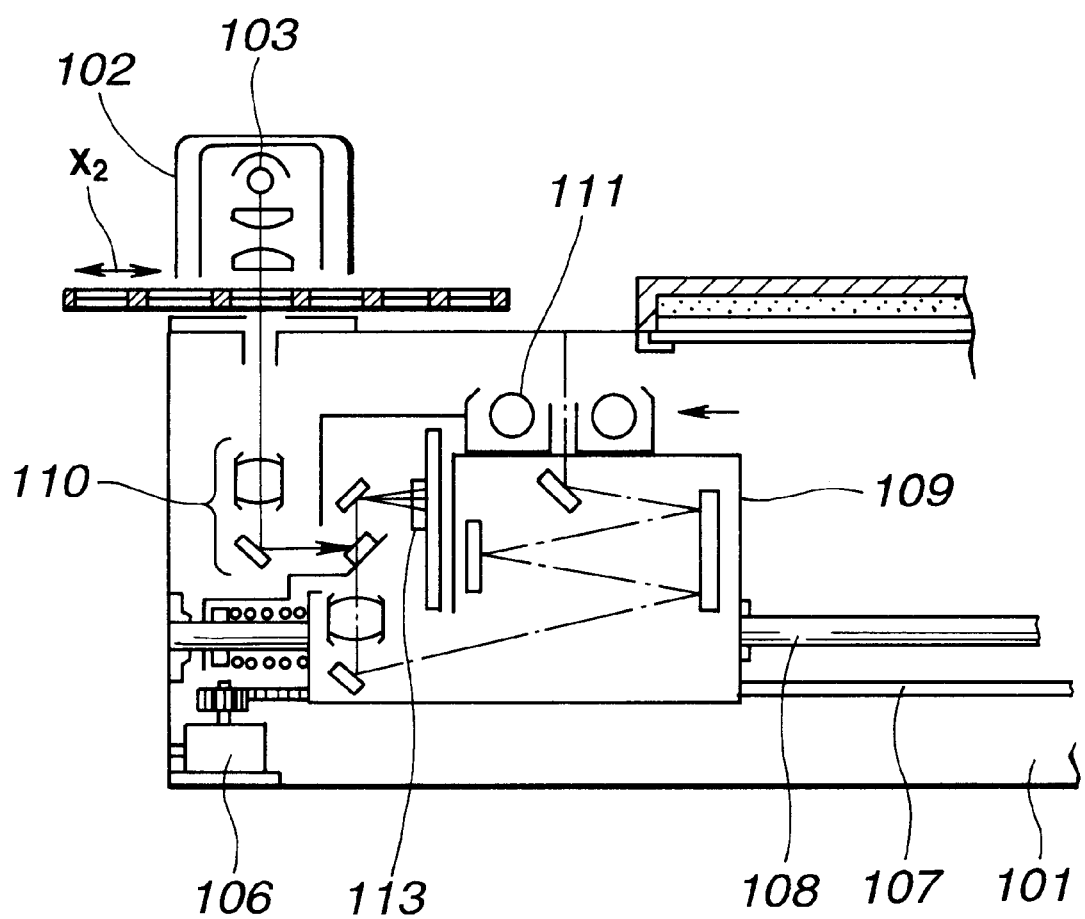
FIG. 15 is a partial sectional view of the image reading apparatus shown in FIG. 14, showing a state in which an image is read from a transmissible original.

Next, image reading preceded by manual selection of a set state will be described in conjunction with the flowchart of FIG. 13 describing image reading (3).

Every time the selection switch 12 is pressed, the state indication on the LCD indicator 13 changes, for example, from the indication shown in FIG. 8A to the one shown in FIG. 8B. A designated lamp/lenses set state is indicated (steps S301 and 302). Thereafter, the position of the lamp and the power of the lenses are changed to the ones specified by the set state designated using the selection switch 12 (step S303). Thereafter, an original is inserted (step S304). The original detector detects the original. With an output sent from the original detector, the CPU 32 recognizes that the original has been inserted (step S305).

Thereafter, the drive motor 26 is powered in order to rotate the feed rollers 21*a* and 21*b*. The original is then fed (step S306). After the original is sent to the position P1 in the center of the optical axis, an image formed on the line sensor 33 by the lens unit 43 is read (step S307).

As mentioned above, image reading preceded by manual selection of a lamp/lenses set state, a special original such as a large-size film or an image in a narrow range on a reflective original can be read.

Next, a variant that is different from the image reading apparatuses of the aforesaid embodiments from the viewpoint of the method of automatically setting the position of the lamp and the power of the lenses for projection will be described.

In automatic setting in the aforesaid embodiments, a transmissible original is the 35-mm film 1 having a small width. The first lamp/lenses set state S1 is suitable for the transmissible original. Moreover, a reflective original is the print 2 having a large width. The second lamp/lenses set state S2 is suitable for the reflective original. However, the set states are not necessarily limited to these ones. According to the present invention, the type of original is judged, and the position of the lamp and the power of the lenses for projection are set to an optimal position and optimal power specified for each type of original. The third or fourth lamp/lenses set state may be, needless to say, specified for a judged type of original instead of the first or fourth lamp/lenses set state associated with the type of original.

For example, when the size of a transmissible original is judged automatically, if it is detected that the original is small, the original is the 35-mm film 1. The first lamp/lenses set state S1 is selected. If a large original is detected, it is a large-size film. The third lamp/lenses set state S3 is selected.

Moreover, as far as a large original is concerned, when the transmissibility of the original is judged automatically, if the original is detected to be transmissible, the original is a large-size film. The third lamp/lenses set state S3 is selected. If the original is detected to be reflective, the original is a print. The fourth lamp/lenses state S4 is selected. This method can also be adopted.

The image reading apparatuses of the embodiments transmit an image to a personal computer or the like, and may therefore be designed so that a user can designate the contents of automatic setting directly at his/her personal computer.

What is claimed is:

1. An image reading apparatus capable of reading image information from a transmissive original or a reflective original located at a reading position, comprising:

a lens unit that moves in a direction substantially vertical to an original located at the reading position to form an image of light transmitted by a transmissive original or light reflected from a reflective original;

a detector for determining whether the original is transmissive or reflective;

an illumination unit movable from one side of the reading position to the other side thereof;

a first control means for controlling the position of the lens unit and the position of the light source on the basis of the determination made by the detector, the first control means being operative to control at least the power of the lens unit for image formation in response to an external control means.

2. An image reading apparatus comprising:

an image forming means for forming an image of light transmitted by a transmissive original or light reflected from a reflective original, the image being formed at a power as a function of the original;

a reading means for reading the image formed by said image forming means;

a light source for illuminating a transmissive original from the side thereof opposite to that of the reading means and for illuminating a reflective original from the same side thereof as the reading means; and display means for indicating at least one of the information concerning the power of said image forming means, information concerning a read range permitted by said reading means, and information concerning the position of said illuminating means.

3. An image reading apparatus capable of reading image information from a transmissive original or reflective original, comprising:

a lens unit that moves in a direction substantially perpendicular to a main planar surface of a transmissive or reflective original stationed in a scanning position so as to form an image from light transmitted by a transmissive original or light reflected from a reflective original;

a detector for determining the type of original located in the scanning position;

an illumination unit movable from one side of the scanning position to the other side thereof; and control means responsive to a determination made by the detector that the original is a reflective original, to set the power of the lens unit to a resolution which is lower than a given value; and responsive to a determination made by the detector that the original is a transmissive original, to set the power of the lens unit to a resolution which is higher than the given value.

4. Apparatus for reading an image from light transmitted by an original which is a developed film, or light reflected from an original which is a print made from a developed film comprising:

image formation lenses for forming an image of an original located at a scanning position;

scanning means for scanning the image formed by the image formation lenses;

a light source for illuminating the original, the light source being located at a position opposite to the image formation lenses relative to the scanning position when the original is a transmissive developed film, and at a position between the scanning position and the image formation lenses when the original is a reflective print made from a developed film; and an adjustment mechanism which sets the power of the image formation lenses to a value higher than a given value when the original is a developed film, and which sets the power of the image formation lenses to a value lower than the given value when the original is a print.

5. An image reading apparatus according to claim 4, further comprising a detector which detects the size of the developed film or print.

6. An image reading apparatus according to claim 4, wherein said image formation lenses include a zooming optical system, and further comprising:

setting means for setting a power for zooming to a large value when the detector determines that the original is a developed film, and for setting the power for zooming to a small value when the detector detects that the original is a print, the setting means being operative in response to the movement of the illuminating means.

7. An image reading apparatus, comprising:

an image forming means including a zooming optical system for forming an image of light transmitted by a transmissive original or light reflected from a reflective original;

a scanner for scanning an image formed by the image forming means;

a detector for determining whether a transmissive or reflective original is located at a scanning position;

a light source movable between a first position on the side of the image forming means or a second position located opposite to the image forming means with respect to the original located at the scanning position; and moving means for moving the light source to the first position when it is determined that a transmissive original is located at the scanning position and for moving the light source to the second position when it is determined that a reflective original is located at the scanning position, and adjusting means interlocked with the moving means for setting the power of the zooming optical system to a high value when the light source is set to the first position, and for setting the power of the zooming optical system to a low value when the light source is set to the second position.

8. An image reading apparatus for reading images from light transmitted by an original which is a developed film, or light reflected from an original which is a print made from a developed film comprising:

feeding means for feeding an original to a reading position;

detector means for detecting whether the original is a developed film or a print made from a developed film;

image forming lenses for forming an image of the original located at the reading position;

a light source;

a positioning mechanism which moves the light source between a first position on the opposite side of the reading position from the image forming lenses when the detecting means detects that the original is a developed film, and a second position on the same side of the reading position as the image forming lenses when the detecting means detects that the original is a print; and an adjustment mechanism which sets the resolution of the image forming lenses to a value higher than a given value when the original is a developed film, and which sets the resolution of the image forming lenses to a value lower than the given value when the original is a print.

\* \* \* \* \*